(12) United States Patent
Zheng et al.

(10) Patent No.: US 8,340,479 B2
(45) Date of Patent: Dec. 25, 2012

(54) ELECTRO-OPTIC MODULATOR WITH INVERSE TAPERED WAVEGUIDES

(75) Inventors: Xuezhe Zheng, San Diego, CA (US); Ashok V. Krishnamoorthy, San Diego, CA (US); John E. Cunningham, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 282 days.

(21) Appl. No.: 12/687,633

(22) Filed: Jan. 14, 2010

(65) Prior Publication Data
US 2011/0170819 A1 Jul. 14, 2011

(51) Int. Cl.
*G02B 6/12* (2006.01)

(52) U.S. Cl. .......................................................... 385/14

(58) Field of Classification Search .................. None
See application file for complete search history.

(56) References Cited

U.S. PATENT DOCUMENTS

| | | | |
|---|---|---|---|
| 6,222,951 B1 * | 4/2001 | Huang | 385/14 |
| 6,222,966 B1 * | 4/2001 | Khan et al. | 385/45 |
| 6,687,425 B2 * | 2/2004 | Ridgway et al. | 385/14 |
| 7,583,869 B2 * | 9/2009 | Kang et al. | 385/14 |
| 7,853,103 B2 * | 12/2010 | Blauvelt et al. | 385/39 |
| 2003/0081902 A1 * | 5/2003 | Blauvelt et al. | 385/50 |
| 2003/0095751 A1 * | 5/2003 | Rogers et al. | 385/43 |
| 2005/0249453 A1 * | 11/2005 | Shih et al. | 385/15 |

OTHER PUBLICATIONS

Kuo, Yu-Hsuan et al., "Strong Quantum-Confined Stark Effect in Germanium Quantum-Well Structures on Silicon", pp. 1334-1336, vol. 437/Oct. 27, 2005, Nature Publishing Group.
Shen, H. et al., "Generalized Franz-Keldysh theory of electromodulation", vol. 42, No. 11, pp. 7097-7102, Oct. 15, 1990-1991.
Fidaner, Onur et al., "Ge-SiGe Quantum-Well Waveguide Photodetectors on Silicon for the Near-Infrared", IEEE Photonics Technology Lettters, vol. 19, No. 20, Oct. 15, 2007, pp. 1631-1633.
Liu, Jifeng et al., "Ultralow Energy, Integrated GeSi Electroabsorption Modulators on SOI", IEEE, 2008, pp. 10-12.
Almeida, Vilson R. et al., "Nanotaper for compact mode conversion", Optics Letters, vol. 28, No. 15, Aug. 1, 2003, pp. 1302-1304.
Krishnamoorthy, Ashok V. et al., "Computer systems based on silicon photonic interconnects", pp. 1-23, IEEE, Dec. 1, 2008. Miller, D. A. B. et al., "Band-Edge Electroabsorption in Quantum Well Structures: The Quantum-Confined Stark Effect", vol. 53, No. 22, pp. 2173-2176, Nov. 26, 1984, The American Physical Society.
Roth, Jonathan E. et al., "Optical modulator on silicon employing germanium quantum wells", Apr. 30, 2007, vol. 15, No. 9, Optics Express, pp. 5851-5859.
Lampin, J. F. et al., "Detection of picosecond electrical pulses using the intrinsic Franz-Keldysh effect", Applied Physics Letters, vol. 78, No. 26, pp. 4103-4105, Jun. 25, 2001.

* cited by examiner

*Primary Examiner* — Sung Pak
(74) *Attorney, Agent, or Firm* — Park, Vaughan, Fleming & Dowler LLP; Steven E. Stupp

(57) ABSTRACT

An integrated circuit that includes an optical waveguide to convey an optical signal via an optical mode in an on-chip optical waveguide is described. In this integrated circuit, a cross-sectional area of the optical waveguide may be tapered in proximity to an electro-optic modulator in the integrated circuit, such as a germanium electro-optic modulator or a quantum-well (QW) electro-optic modulator. In particular, the cross-sectional area may be tapered from a first diameter distal from the electro-optic modulator to a second diameter proximate to the electro-optic modulator. This so-called 'inverse taper' may increase the spatial extent or size of the optical mode, thereby allowing the optical signal to be optically coupled to or from the electro-optic modulator with low optical loss.

18 Claims, 4 Drawing Sheets

ELECTRO-OPTIC MODULATOR WITH INVERSE TAPERED WAVEGUIDES

GOVERNMENT LICENSE RIGHTS

The United States Government has a paid-up license in this invention and the right in limited circumstances to require the patent owner to license others on reasonable terms as provided for by the terms of Agreement No. HR0011-08-9-0001 awarded by the Defense Advanced Research Projects Administration.

BACKGROUND

1. Field

The present disclosure generally relates to electro-optic-modulator circuits. More specifically, the present disclosure relates to an electro-optic-modulator circuit that includes an inverse tapered waveguide.

2. Related Art

Silicon photonics is a promising new technology that can provide low-power, high-bandwidth and low latency-interconnects in future computing systems. However, in order to implement silicon photonic links, efficient light modulators are needed. It is complicated to construct efficient light modulators because the electro-optic effect in silicon (Si) is weak. As a consequence, a number of different of modulation mechanisms are being investigated. Two promising modulation mechanisms are the electro-absorption associated with the quantum-confined stark effect (QCSE) in SiGe/Ge quantum-well (QW) devices, and the electro-absorption associated with the Franz-Keldysh (FK) effect in tensile-strained germanium (Ge).

QCSE provides a strong electro-absorption mechanism, and has been used to make high-speed, low-power and compact opto-electronic devices using III-V materials. In practice, electro-absorption associated with the QCSE in a multiple QW structure that includes germanium QWs which are separated by silicon-germanium barriers can offer a much stronger electro-optic effect than a depletion-based silicon light modulator. Consequently, silicon-germanium QCSE devices can provide broadband operation with low driver voltage. In addition, the same QCSE device can be used as either a light modulator or a photo detector.

Similarly, increased electro-absorption (relative to silicon) can also be achieved using the FK effect in $Ge_{1-x}Si_x$ (for example, using the enhanced FK effect in tensile strained, epitaxial germanium-on-silicon). Because the FK effect takes place on a sub-pico-second time scale, the speed of the electro-absorption mechanism based on the FK effect is only limited by the RC delay, and can be designed to achieve very high bandwidth. Moreover, the same FK-effect device can also be used as a photo detector with high responsivity and high bandwidth.

However, it is very challenging to integrate these light modulators with silicon-based optical waveguides, which makes it hard to use these light modulators. In particular, it is very challenging to fabricate electro-absorption light modulators with sub-micron on-chip silicon optical waveguides because epitaxial growth is needed for the active material layers in the electro-absorption light modulators, such as the multilayer QW structures or the tensile-strained germanium layer. This epitaxial growth is in a direction normal to the substrate, while the silicon optical waveguides carrying the optical signals are normally in the plane of the substrate. Moreover, it is difficult to couple the light from a sub-micron silicon optical waveguide to the active material layers to modulate the light, and then to couple the modulated light back to a sub-micron output silicon optical waveguide with low optical loss.

Hence, what is needed is an electro-optic-modulator circuit that does not suffer from the above-described problems.

SUMMARY

One embodiment of the present disclosure provides an integrated circuit that includes a substrate. Disposed on a surface of the substrate, the integrated circuit includes a first optical waveguide having a first end, and a second optical waveguide having a second end. Moreover, an electro-optic modulator is positioned between and is mechanically coupled to the first end and the second end. Note that a cross-sectional area of a given optical waveguide (which can include the first optical waveguide or the second optical waveguide) is tapered from a first diameter distal from a given end (which can include the first end or the second end) to a second, smaller diameter proximate to the given end, thereby facilitating optical coupling between the given optical waveguide and the electro-optic modulator.

In some embodiments, the substrate includes a semiconductor, such as silicon. Moreover, the taper of the given optical waveguide may be over a length of a region of the given optical waveguide. For example, the length of the region may be between 10 and 200 µm. In addition, the first diameter of the given optical waveguide may be less than 1 µm, and the second diameter of the given optical waveguide may be less than 0.25 µm.

Furthermore, the electro-optic modulator may include a germanium electro-optic modulator or a quantum-well (QW) electro-optic modulator. Note that the QW electro-optic modulator may include alternating layers of silicon and silicon-germanium. Additionally, the integrated circuit may include an underlayer between the surface of the substrate and the QW electro-optic modulator. This underlayer may include germanium.

In some embodiments, the integrated circuit includes an optical-coupling material between the given end and a side of the electro-optic modulator.

Another embodiment provides a system that includes the integrated circuit.

Another embodiment provides a method for selectively optically modulating an optical signal in an integrated circuit. During operation, the integrated circuit conveys the optical signal using an optical mode in an optical waveguide, where the optical waveguide has an end and is disposed on a surface of a substrate. Then, the integrated circuit increases a spatial extent of the optical mode in proximity to the end using a taper of a cross-sectional area of the optical waveguide. Moreover, the integrated circuit optically couples the optical signal to an electro-optic modulator that is disposed on the surface of the substrate, and which is mechanically coupled to the end. Next, the integrated circuit selectively optically modulates the optical signal in the electro-optic modulator based on an electrical signal.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of an integrated circuit, a system that includes the integrated circuit, and a method for selectively optically modulating an optical signal in the integrated circuit are described. This integrated circuit includes an on-chip optical waveguide to convey an optical signal via an optical mode in the optical waveguide. Moreover, a cross-sectional area of the optical waveguide may be tapered in proximity to an electro-optic modulator in the integrated circuit, such as a germanium electro-optic modulator or a quantum-well (QW) electro-optic modulator. In particular, the cross-sectional area may be tapered from a first diameter distal from the electro-optic modulator to a second diameter proximate to the electro-optic modulator. This so-called 'inverse taper' may increase the spatial extent or size of the optical mode, thereby allowing the optical signal to be optically coupled to or from the electro-optic modulator with low optical loss. Consequently, the integrated circuit may solve the problem of integrating the electro-optic modulator with on-chip, sub-micron optical waveguides.

While a wide variety of materials can be used as a substrate in the integrated circuit (such as a semiconductor, glass or plastic), in the discussion that follows silicon is used as an illustrative example.

Figure 1:
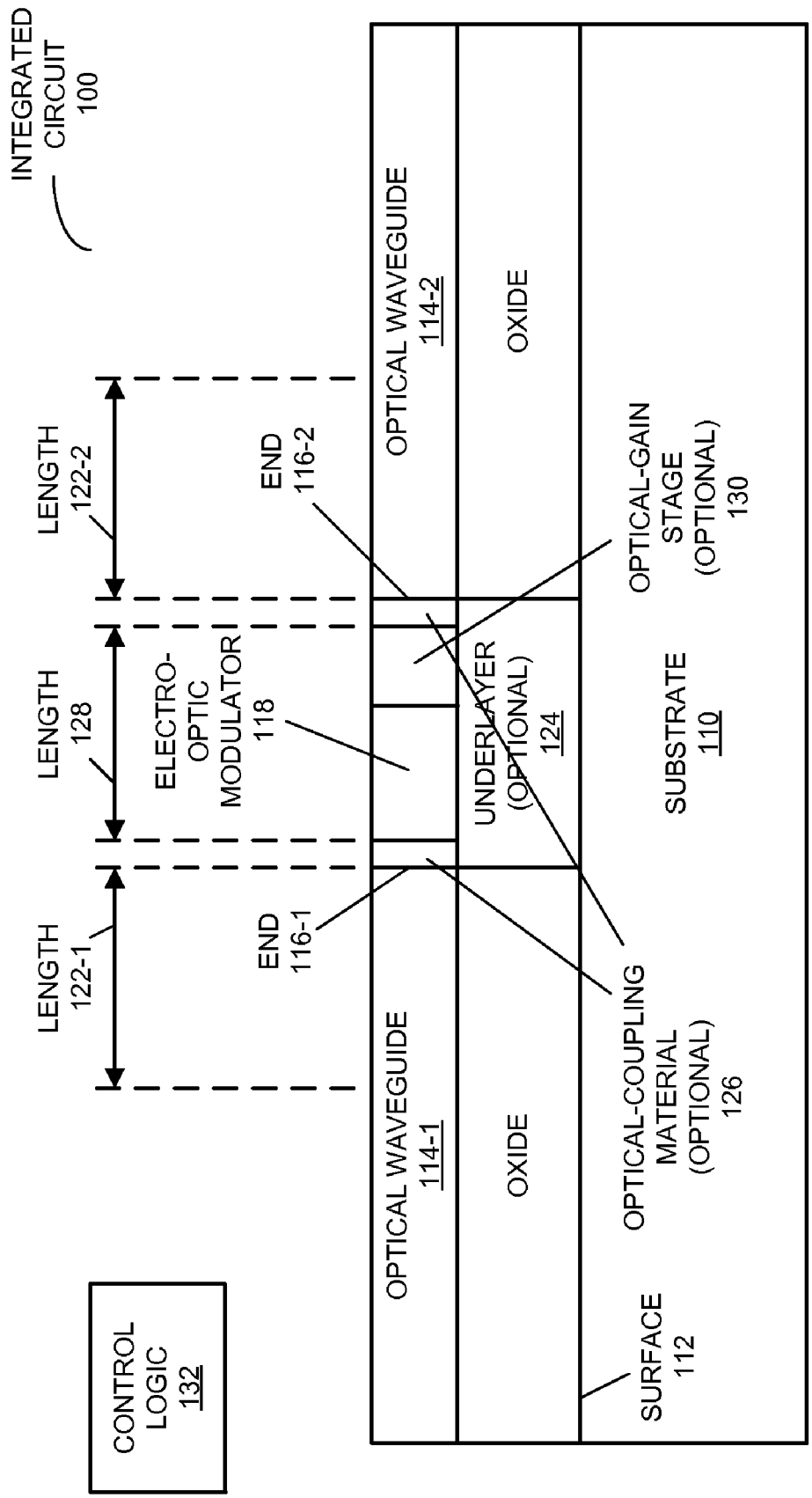
FIG. 1 is a block diagram illustrating a side view of an integrated circuit in accordance with an embodiment of the present disclosure.
Figure 2:
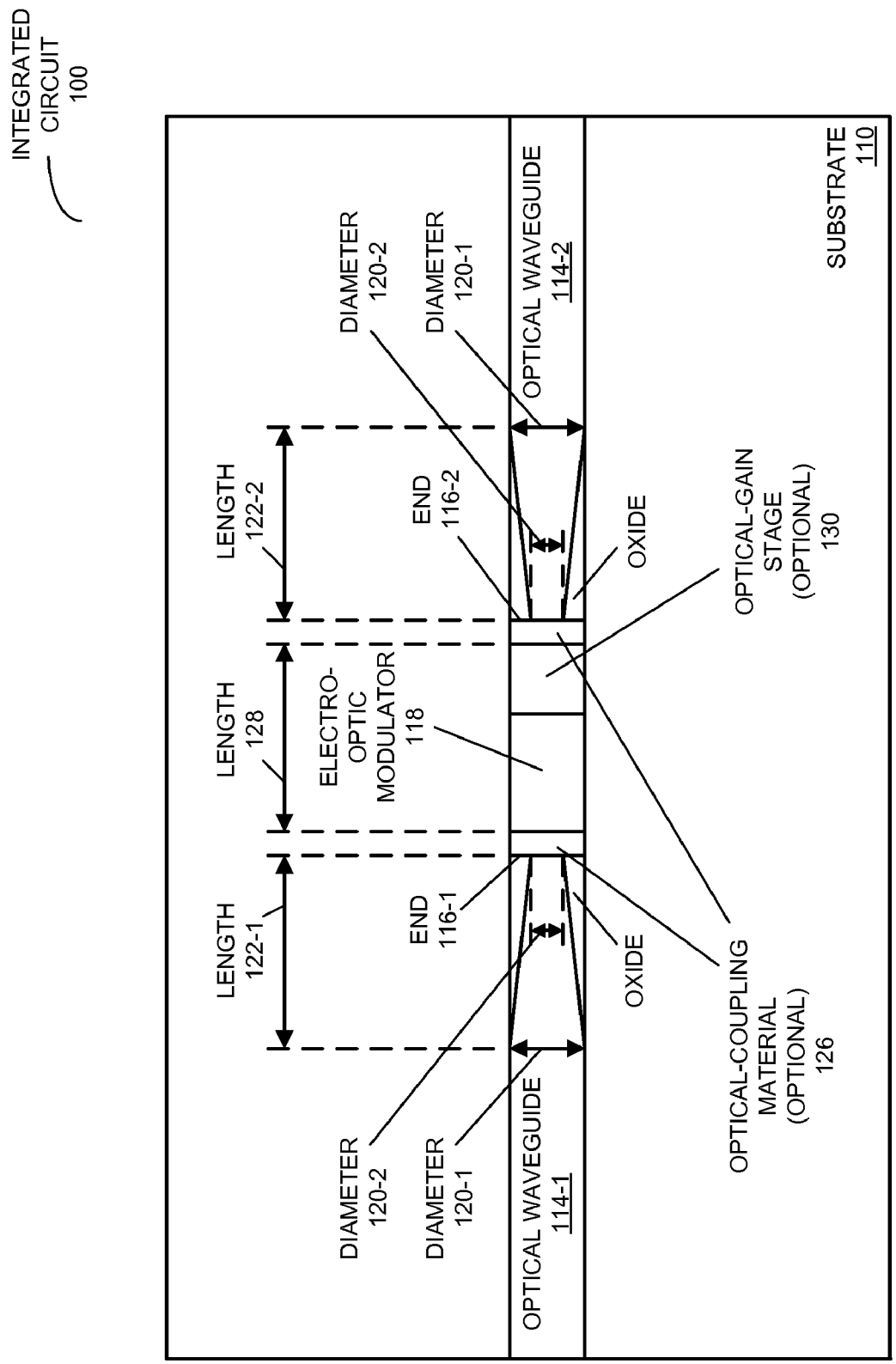
FIG. 2 is a block diagram illustrating a top view of the integrated circuit in FIG. 1 in accordance with an embodiment of the present disclosure.

We now describe embodiments of the integrated circuit. FIG. 1 presents a block diagram illustrating a side view of an integrated circuit 100, and FIG. 2 presents a block diagram illustrating a top view of integrated circuit 100. This integrated circuit includes a substrate 110 (such as silicon). Disposed on a surface 112 of substrate 110, integrated circuit 100 includes an optical waveguide 114-1 having an end 116-1, and an optical waveguide 114-2 having an end 116-2. These optical waveguides may convey an optical signal (i.e., light) having wavelengths between 1.1-1.7 µm, such as an optical signal having a fundamental wavelength of 1.3 or 1.55 µm.

Moreover, an electro-optic modulator 118 is positioned between and mechanically coupled to ends 116. This electro-optic modulator may be turned 'on' or 'off' (i.e., may block or pass the light) based on an applied voltage that is controlled by control logic 132.

Note that a cross-sectional area of a given optical waveguide (which can include optical waveguide 114-1 or optical waveguide 114-2) is tapered from a diameter 120-1 distal from a given end (which can include end 116-1 or end 116-2) to a smaller diameter 120-2 proximate to the given end, thereby facilitating optical coupling between the given optical waveguide and electro-optic modulator 118.

Furthermore, the taper of the given optical waveguide may be over a length (such as one of lengths 122) of a region of the given optical waveguide. For example, each of lengths 122 may be between 10 and 200 µm. In addition, diameter 120-1 of the given optical waveguide may be less than 1 µm, and diameter 120-2 of the given optical waveguide may be less than 0.25 µm. For example, each of lengths 122 may be 100 µm, diameter 120-1 may be 0.5 µm, and diameter 120-2 may be 100 nm.

Note that electro-optic modulator 118 may include a germanium electro-optic modulator or a QW electro-optic modulator that provides electro-absorption using the quantum-confined stark effect (QCSE). Note that the QW electro-optic modulator may include alternating layers of silicon and silicon-germanium as the active electro-absorption material. When SiGe/Ge QWs are grown on crystal silicon, a silicon-germanium buffer layer typically needs to be grown first to gradually relax the lattice mismatch between the crystal structures of germanium and silicon.

One possible way to fabricate a QCSE QW electro-optic modulator on a silicon-on-insulator (SOI) substrate with sub-micron optical waveguides is to use a selective growth technique in which electro-optic modulator 118 is grown in a 'hole' in optical waveguides 114. For example, a window may be opened up on an SOI substrate with sub-micron optical waveguides by etching away the optical waveguide and the buried oxide. Then, using selective epitaxial growth, the QCSE QW electro-optic modulator can be fabricated in the hole, starting with an optional buffer or underlayer 124 on surface 112, followed by the SiGe/Ge QWs, and then a cap layer. For example, this underlayer may include pure germanium. Note that optional underlayer 124 may extend under optical waveguides 114 or may only be located under electro-optic modulator 118.

Note that the thickness of optional underlayer 124 and the QWs may be controlled such that the center of the QWs is aligned with the center of the optical-waveguide optical mode (thereby reducing or eliminating optical absorption in optional underlayer 124). In this way, light from the input optical waveguide (such as optical waveguide 114-1) is butt-coupled to the region with the QCSE QWs, where it is modulated and then butt-coupled back to the output optical waveguide (such as optical waveguide 114-2).

One problem with this approach is that, in the region with the QCSE QWs, light is weakly guided in the vertical direction, whereas in optical waveguides 114 it is highly confined due to the big difference between the index or refraction of silicon and silicon dioxide. Stated differently, the spatial extent of the optical mode in the sub-micron silicon optical waveguides is significantly smaller than the spatial extent of the optical mode in the region with the QCSE QWs. As a consequence, significant optical-coupling loss can occur at both of ends 116. For example, if a sub-micron optical waveguide has an optical-mode size of 0.25 µm, and the region with the QCSE QWs has an optical-mode size of 2 µm in the vertical direction, there will be more than 10 dB optical-coupling loss at each of ends 116. A modulator with such high insertion loss is useless.

Integrated circuit 100 reduces or eliminates this optical-mode mismatch problem using inverse nano-tapers of optical waveguides 114. In particular, instead of terminating the sub-micron optical waveguide directed at the interface with the region with the QCSE QWs (i.e., at one of ends 116 in proximity to electro-optic modulator 118), input optical waveguide 114-1 and output optical waveguide 114-2 each have a nano-tip in which the inverse tapers terminate at respective ends 116. These inverse nano-tapers expand the spatial extent of the optical mode. With proper design of the taper, the optical-mode size at ends 116 can match that of electro-optic modulator 118. Therefore, low optical-coupling loss can be achieved when coupling light in and out of the region with the QCSE QWs.

In another embodiment, epitaxial $Ge_{1-x}Si_x$ is used as active electro-absorption material in electro-optic modulator 118 using the Franz-Keldysh (FK) effect. Instead of growing SiGe/Ge QWs, $Ge_{1-x}Si_x$ material may be grown between the two cap layers in the hole. Once again, the inverse nano-tapers of optical waveguides 114 may be used to optically couple the light in and out of the region with the active $Ge_{1-x}Si_x$ material in electro-optic modulator 118 with low optical-coupling loss. For example, bulk germanium may be used. This grows directly onto silicon, and has a high index of refraction, but has weaker electro-optic modulation than the QCSE QWs. Better contrast or extinction (i.e., a better on/off modulation ratio) can be obtained by increasing length 128 of electro-optic modulator 118, but the average power may be decreased. Alternatively or additionally, an optional optical-gain stage 130 may be used in integrated circuit 100.

Note that the optical coupling may be increased by decreasing the surface roughness (and, thus, the scattering loss) of ends 116. Alternatively, the spatial extent of the optical mode may be increased using the inverse nano-taper so that the light doesn't 'see' ends 116. However, a larger optical-mode size increases the capacitance, and thus the modulation energy. For this reason, there may be an upper bound on the modulated volume in electro-optic modulator 118.

Additionally, note that the layers grown in the hole may have a pyramidal shape (i.e., there may be a wall angle associated with the growth). To address this, the layers may be overgrown and polished back to obtain a desired total thickness of the active region in electro-optic modulator 118. For example, a dry etch may be used to obtain vertical walls proximate to ends 116. In some embodiments, integrated circuit 100 includes an optional optical-coupling material 126 between the given end and a side of electro-optic modulator 118 to fill in any resulting space(s). Ideally, optional optical-coupling material 126 material has an index of refraction between that of silicon and the material(s) in electro-optic modulator 118. For example, optional optical-coupling material 126 may include silicon nitride or silicon dioxide.

In exemplary embodiments, length 128 of a germanium electro-optic modulator is 50 μm, and length 128 of a QW electro-optic modulator is 25 μm. Furthermore, there may be 30-60 periods of alternating SiGe/Ge layers in the QW electro-optic modulator. For example, there may be 20 periods. Note that the multiple QW active structure may have a germanium-layer thickness of 135 Å as the QW layer, and a $Ge_{20}Si_{80}$-layer thickness of 65 Å as the barrier layer.

Moreover, the multiple QW active structure may be fabricated in the hole as follows. Starting with the silicon substrate and continuing up to the top silicon-on-insulator (SOI) layer: a 0.25-μm thick $Ge_{90}Si_{10}$ layer with p-type doping ($1e18$ $cm^{-3}$) using boron may be fabricated. Then, the multiple QWs may be fabricated with a total thickness of 0.4 μm and no doping. Next, a 0.4-μm thick $Ge_{90}Si_{10}$ layer with n-type doping ($1e18$ $cm^{-3}$) using phosphorous and/or arsenic may be fabricated.

Note that the p-type germanium-silicon layer (i.e., optional underlayer 124) may provide a thin buffer layer to relax strain and to generate a new lattice constant for the layers in the multiple QWs. Moreover, the p-type germanium-silicon layer may provide a contact window to facilitate an electric field normal to the plane of the multiple QWs. The thickness of this layer may be selected to enhance the amplitude of the optical field associated with the optical mode in the multiple QW layers so that the amplitude in optional underlayer 124 and in the top-contact or cap layer is reduced. This n-type cap layer provides the contact window to initiate electric-field lines of force that are closed by the bottom p-type contact window (i.e., optional underlayer 124). Furthermore, the silicon-alloy content in the contact windows may be chosen to minimize the lattice mismatch between the layers in the multiple QWs and the lattice constant of optional underlayer 124. Thus, the new lattice constant may be uniform in the active-layer design, and may be set to the relaxed lattice constant of optional underlayer 124.

Figure 3:
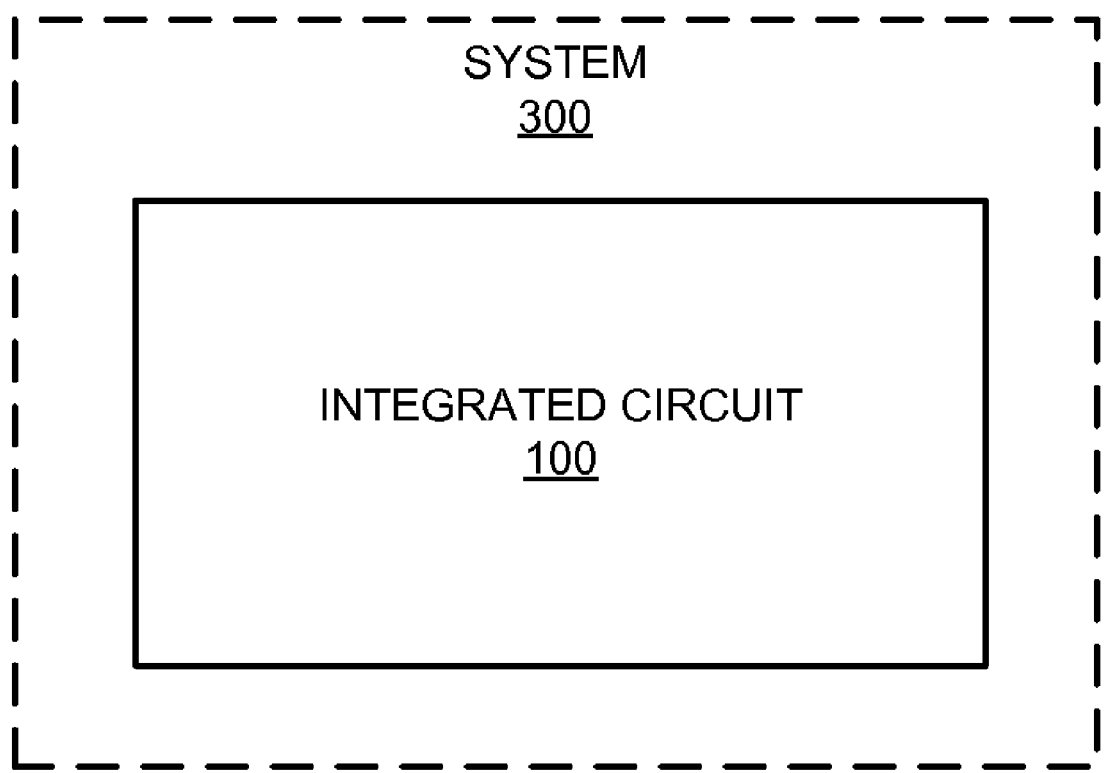
FIG. 3 is a block diagram illustrating a system that includes the integrated circuit of FIGS. 1 and 2 in accordance with an embodiment of the present disclosure.

Integrated circuit 100 may be used in a variety of applications. This is shown in FIG. 3, which presents a block diagram illustrating a system 300 that includes the integrated circuit 100. System 300 may includes: a VLSI circuit, a switch, a hub, a bridge, a router, a communication system, a storage area network, a data center, a network (such as a local area network), and/or a computer system (such as a multiple-core processor computer system). Furthermore, the computer system may include, but is not limited to: a server (such as a multi-socket, multi-rack server), a laptop computer, a communication device or system, a personal computer, a work station, a mainframe computer, a blade, an enterprise computer, a data center, a portable-computing device, a super-computer, a network-attached-storage (NAS) system, a storage-area-network (SAN) system, and/or another electronic computing device. Note that a given computer system may be at one location or may be distributed over multiple, geographically dispersed locations.

Integrated circuit 100 (FIGS. 1 and 2), as well as system 300, may include fewer components or additional components. Although integrated circuit 100 (FIGS. 1 and 2), as well as system 300, are illustrated as having a number of discrete items, these circuits and devices are intended to be functional descriptions of the various features that may be present rather than structural schematics of the embodiments described herein. Consequently, in these embodiments two or more components may be combined into a single component, and/or a position of one or more components may be changed. In addition, functionality in the preceding embodiments of the integrated circuit and system may be implemented more in hardware and less in software, or less in hardware and more in software, as is known in the art. For example, functionality may be implemented in one or more application-specific integrated circuits (ASICs) and/or one or more digital signal processors (DSPs).

While the preceding embodiments have been illustrated with particular elements and compounds, a wide variety of materials and compositions (including stoichiometric and non-stoichiometric compositions) may be used, as is known to one of skill in the art. Furthermore, these materials and compounds may be fabricated using a wide variety of processing techniques, including evaporation, sputtering, molecular-beam epitaxy, wet or dry etching (such as photo-lithography or direct-write lithography), polishing, etc.

Figure 4:
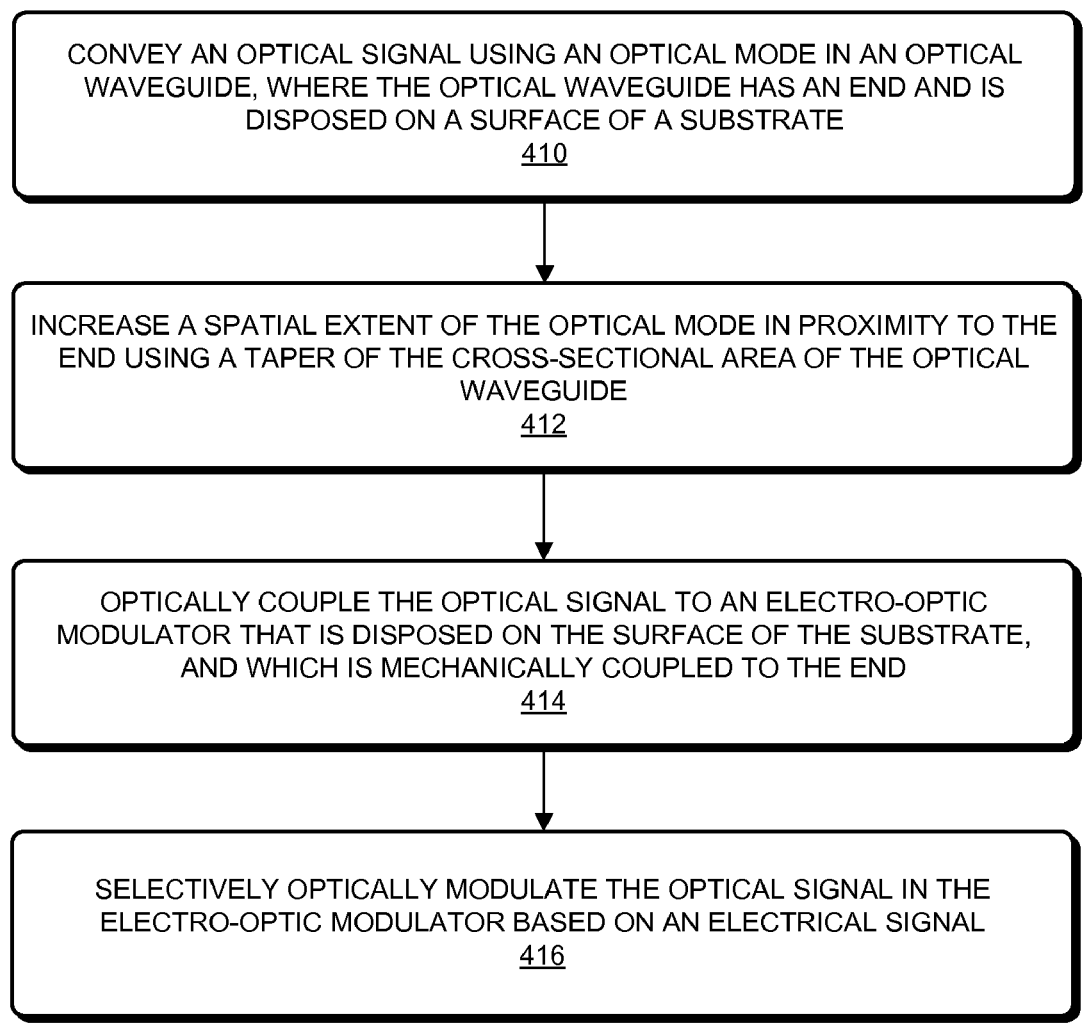
FIG. 4 is a flow chart illustrating a process for selectively optically modulating an optical signal in the integrated circuit of FIGS. 1 and 2 in accordance with an embodiment of the present disclosure.

We now describe embodiments of a process. FIG. 4 presents a flow chart illustrating a process 400 for selectively optically modulating an optical signal in integrated circuit 100 (FIGS. 1 and 2). During operation, the integrated circuit conveys the optical signal using an optical mode in an optical waveguide (operation 410), where the optical waveguide has an end and is disposed on a surface of a substrate. Then, the integrated circuit increases a spatial extent of the optical mode in proximity to the end using a taper of a cross-sectional area of the optical waveguide (operation 412). Moreover, the integrated circuit optically couples the optical signal to an electro-optic modulator that is disposed on the surface of the substrate, and which is mechanically coupled to the end (operation 414). Next, the integrated circuit selectively optically modulates the optical signal in the electro-optic modulator based on an electrical signal (operation 416).

In some embodiments of process 400, there are additional or fewer operations. Moreover, the order of the operations may be changed, and/or two or more operations may be combined into a single operation.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An integrated circuit, comprising a substrate, wherein disposed on a surface of the substrate, the integrated circuit includes:
   a first optical waveguide having a first end;
   a second optical waveguide having a second end;
   an electro-optic modulator positioned between and mechanically butt-coupled to the first end and the second end, wherein a cross-sectional area of a given optical waveguide, which can include the first optical waveguide or the second optical waveguide, is tapered from a first diameter distal from a given end, which can include the first end or the second end, to a second, smaller diameter proximate to the given end, thereby facilitating optical coupling between the given optical waveguide and the electro-optic modulator; and
   an underlayer between the surface of the substrate and the electro-optic modulator.

2. The integrated circuit of claim 1, wherein the substrate includes a semiconductor.

3. The integrated circuit of claim 2, wherein the semiconductor includes silicon.

4. The integrated circuit of claim 1, wherein the taper of the given optical waveguide is over a length of a region of the given optical waveguide.

5. The integrated circuit of claim 4, wherein the length is between 10 and 200 μm.

6. The integrated circuit of claim 1, wherein the electro-optic modulator includes a germanium electro-optic modulator.

7. The integrated circuit of claim 1, wherein the electro-optic modulator includes a quantum-well (QW) electro-optic modulator.

8. The integrated circuit of claim 7, wherein the QW electro-optic modulator includes alternating layers of silicon and silicon-germanium.

9. The integrated circuit of claim 1, wherein the underlayer includes germanium.

10. The integrated circuit of claim 1, wherein the first diameter of the given optical waveguide is less than 1 μm; and
    wherein the second diameter of the given optical waveguide is less than 0.25 μm.

11. The integrated circuit of claim 1, wherein the integrated circuit further includes an optical-coupling material between the given end and a side of the electro-optic modulator.

12. A system, comprising:
    a processor; and
    an integrated circuit, wherein the integrated circuit includes a substrate, and wherein disposed on a surface of the substrate, the integrated circuit includes:
       a first optical waveguide having a first end;
       a second optical waveguide having a second end;
       an electro-optic modulator positioned between and mechanically butt-coupled to the first end and the second end, wherein a cross-sectional area of a given optical waveguide, which can include the first optical waveguide or the second optical waveguide, is tapered from a first diameter distal from a given end, which can include the first end or the second end, to a second, smaller diameter proximate to the given end, thereby facilitating optical coupling between the given optical waveguide and the electro-optic modulator; and
    an underlayer between the surface of the substrate and the electro-optic modulator.

13. The system of claim 12, wherein the substrate includes a semiconductor.

14. The system of claim 12, wherein the taper of the given optical waveguide is over a length of a region of the given optical waveguide.

15. The system of claim 12, wherein the electro-optic modulator includes a germanium electro-optic modulator.

16. The system of claim 12, wherein the electro-optic modulator includes a QW electro-optic modulator.

17. The system of claim 16, wherein the QW electro-optic modulator includes alternating layers of silicon and silicon-germanium.

18. A method for selectively optically modulating an optical signal in an integrated circuit, comprising:
    conveying the optical signal using an optical mode in an optical waveguide, wherein the optical waveguide has an end and is disposed on a surface of a substrate;
    increasing a spatial extent of the optical mode in proximity to the end using a taper of a cross-sectional area of the optical waveguide;
    optically coupling the optical signal to an electro-optic modulator that is disposed on the surface of the substrate, and which is mechanically butt-coupled to the end, wherein an underlayer is located between the surface of the substrate and the electro-optic modulator; and
    selectively optically modulating the optical signal in the electro-optic modulator based on an electrical signal.

* * * * *